United States Patent [19]

Bergeron

[11] 4,423,286

[45] Dec. 27, 1983

[54] APPARATUS AND METHOD FOR DETERMINING THE POSITION OF A DRIVEN COIL WITHIN A GRID OF SPACED CONDUCTORS

[75] Inventor: Gary A. Bergeron, Phoenix, Ariz.

[73] Assignee: Talos Systems, Inc., Scottsdale, Ariz.

[21] Appl. No.: 400,511

[22] Filed: Jul. 21, 1982

[51] Int. Cl.³ .................................. G08C 21/00
[52] U.S. Cl. .......................................... 178/19
[58] Field of Search ............. 178/19, 18, 17 D, 87; 33/1 M; 364/518, 520

[56] References Cited

U.S. PATENT DOCUMENTS

3,832,693  8/1974  Ishizaki et al. .................. 178/19
4,029,899  6/1977  Gordon .............................. 178/19

*Primary Examiner*—Stafford D. Schreyer
*Attorney, Agent, or Firm*—Louis Etlinger; Richard I. Seligman

[57] ABSTRACT

A digitizing system includes a first plurality of spaced parallel grid conductors and a second plurality of spaced parallel grid conductors orthogonal to the first plurality of spaced parallel grid conductors. The location of a movable coil arranged on a pen or cursor is determined for each plurality of grid conductors coarsely by sampling the voltage induced in one of the grid conductors from a signal applied to the coil to determine whether the coil is above or below this grid conductor. Through careful selection, a very few grid conductors can be sampled to quickly locate the two grid conductors immediately adjacent to the center of the driven coil. The ratio of the voltages present on these two grid conductors is matched against a list of known ratios representing various positions between the two grid conductors.

20 Claims, 4 Drawing Figures

APPARATUS AND METHOD FOR DETERMINING THE POSITION OF A DRIVEN COIL WITHIN A GRID OF SPACED CONDUCTORS

BACKGROUND OF THE INVENTION

This invention relates to a method and apparatus for determining the position of a coil with respect to a grid of spaced conductors and more particularly to such instruments which are relatively simple and low cost.

Various high resolution apparatus for translating a position of a movable instrument, such as a pointer or pen, into electrical signals for transmission to a local or remote utilization device are well known in the art.

U.S. Pat. No. 4,210,775, assigned to Talos Systems, Inc., pertains to a digitizer in which an instrument, such as a pen having a coil disposed about a nosepiece located immediately above the writing tip of the pen, is utilized in conjunction with a tablet comprising a grid of conductors, including a group of parallel spaced conductors oriented in an X direction and a group of parallel spaced conductors oriented in a Y direction. The pen tip is moved along a worksheet disposed on a support surface containing the grid of conductors. An oscillator applies a signal of predetermined constant frequency and amplitude to the coil. The coil is inductively coupled to the conductors of the grid, thereby inducing signals in the conductors. In accordance with electromagnetic theory, the magnitude and phase of the signals induced in the respective grid conductors depend on the location of the conductors with respect to the pen tip. The grid conductors in each group are sequentially scanned to sequentially couple the induced signals to a differential amplifier by means of multiplexing circuitry. The multiplexing circuitry selects the respective grid conductors in response to an address decoder. The address decoder is driven by a scan counter. The scan counter is incremented by a signal produced by a divider circuit driven by the oscillator. A position counter is incremented in response to the oscillator as the X and Y groups of grid conductors are sequentially scanned. A phase sensitive detector responsive to the output of the amplifier produces a positive signal having a step-like envelope as grid conductors approaching one side of the pen tip are sequentially scanned. The phase sensitive detector also produces a negative signal having a step-like envelope as conductors on the opposite side of the pen tip are sequentially scanned in a direction away from the pen tip. The signal produced by the phase sensitive detector is filtered to produce a characteristic wave shape signal having a positive peak as the scanning approaches the pen tip. The filtered signal falls steeply across the zero axis to a negative peak as the scanning passes under the pen tip, and decreases as the scanning continues in the direction away from the pen tip. The filtered signal is differentiated and compared to a predetermined threshold level to produce a stop pulse. The stop pulse is utilized to disable the position counter. At this point the contents of the position counter represent the location of the pen tip with respect to the X group of grid conductors and are loaded into an output register. The contents of the output register are then outputted to a utilization device. The scan counter and the position counter are reset and the conductors of the Y group of grid conductors are scanned in a similar manner to produce a digital position number representing location of the pen tip with respect to the Y group of conductors.

Other patents which employ multiplexers to sequentially scan the respective X and Y conductors of groups of parallel spaced conductors and assigned to Talos Systems, Inc. include U.S. Pat. Nos. 4,185,165 and 4,260,852. While all of these patents which employ multiplexers to sequentially scan the grid conductors produce desirable results in a satisfactory manner, the equipment to accomplish these results are relatively complex and costly.

Accordingly, it is an object of this invention to provide a simplified and lower cost digitizer.

SUMMARY OF THE INVENTION

Briefly described and in accordance with one embodiment thereof, the invention provides a digitizing system and method for converting a position of an instrument, such as a pen or cursor, to an electrical signal representing a position of the instrument with respect to a grid of conductors. The instrument generally includes a coil for coupling electrical signals to a grid of conductors including a group of parallel spaced conductors oriented in an X direction and a group of parallel spaced conductors oriented in a Y direction. For one embodiment of the invention sixty-four parallel spaced conductors are arranged in both the X and Y directions with a constant spacing between conductors. Typically, the conductors are deposited on a printed circuit board with the conductors in the X direction deposited on one side of the printed circuit board and the conductors in the Y direction deposited on the other side of the printed circuit board; however, alternatively, wires or other conductors may be embedded or disposed upon some other non-conducting surface.

The pen or cursor which operates in conjunction with the grid conductors comprises a coil of wire wound on a non-metallic form. An oscillator applies a signal to the coil of a predetermined frequency, typically 100 Khz. Typically, the coil operates at 12 volts at 150 milliamps. The more current, the larger the signal induced in the conductors of the grid, however, heating problems limit the amount of current which can be applied to the coil. The coil is inductively coupled to the conductors of the grid, thereby inducing signals in the conductors. In accordance with electromagnetic theory, the magnetic and polarity of the signals induced in the respective grid conductors depends upon the location of the conductors with respect to the coil.

A multiplexing circuit is employed to sample the signal from the center conductor of the X direction array of conductors. By determining whether the signal is of a positive or negative polarity, the location of the coil with respect to the grid conductors is known, that is, whether the coil lies above or below the sampled center conductor. The multiplier then samples the signal from the center conductor of the half section (upper or lower) in which the coil is located, and again, by ascertaining whether the signal is positive or negative, a determination is made in which quarter section the coil is located. Additional readings are taken in the same fashion until it is ascertained that the coil lies between two adjacent X direction conductors.

If the coil is exactly equidistant between the two conductors, the magnitude of signal induced in each conductor will be equal and opposite in polarity, and therefore, it is known that the coil is, in fact, precisely in the middle of the two conductors. When the coil is not equidistant between the two conductors, the magnitude of the signal from the two conductors will increase or decrease. That is, one will increase, the other will decrease.

The exact coil position is then determined by forming a ratio of the induced signal from the two conductors and comparing this ratio with values stored in a look-up table. Since ratios between the two signals are employed rather than using absolute values, any variation in signal strength from the coil to the conductors will have no effect on the measurement. Also, the measurements will be frequency and phase insensitive.

A like set of measurements is then made sampling signals from the Y direction array of conductors to precisely locate the coil with respect to the Y direction array of conductors.

BRIEF DESCRIPTION OF THE DRAWINGS

The above-mentioned and other features and objects of the invention will become more apparent by reference to the following description taken in conjunction with the accompanying drawings, in which.

DESCRIPTION OF A PREFERRED EMBODIMENT

Figure 1:
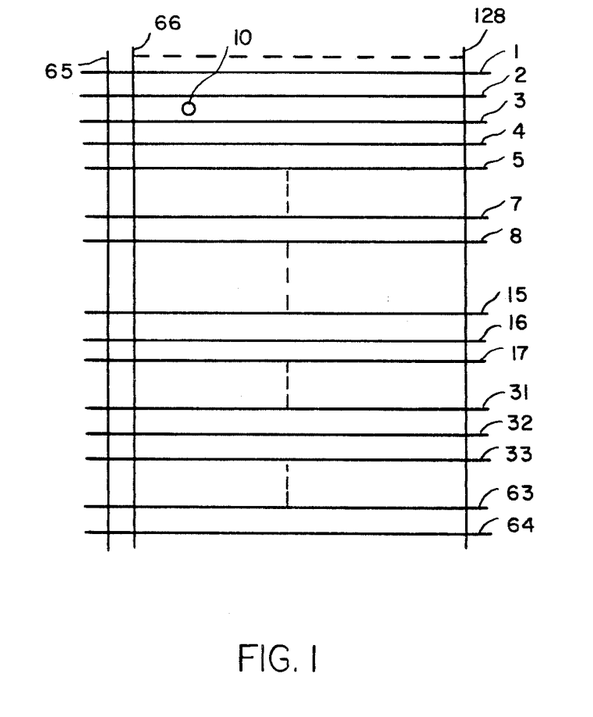
FIG. 1 is an illustration of the grid conductors of a digitizer illustrating the manner in which the location of a coil contained within the grid is ascertained.

Referring now to FIG. 1 of the drawings, there is illustrated thereby, schematically, the grid conductors of a tablet. This tablet typically contains sixty-four parallel conductors (numbered 1–64) arranged in the X direction and sixty-four parallel conductors (numbered 65–128) arranged in the Y direction. Assuming the location of a coil at position 10 during one moment in time, the function of the digitizer is to determine that location precisely. In accordance with this invention, an ac signal is applied to the coil and is inductively coupled to the conductors. X conductors on one side of the coil will have a positive signal induced therein, while X conductors on the opposite side of the coil will have a negative signal induced therein. Thus, by noting the polarity of the signal induced in a particular conductor being sampled, it is readily ascertained that the coil is either above or below such conductor.

In accordance with the principles of this invention, the signal inductively coupled from the coil to a conductor in the middle of the tablet is sampled, for example, conductor 32. When the signal on that conductor is sampled, it is determined by the polarity of the signal that the coil is, in fact, above the conductor 32 and within the area containing the conductors 1–32. Accordingly, it is not necessary to sample any signals induced in conductors 33–64. The next sampling is taken at a conductor in the center of the upper half of the tablet such as conductor 16. By noting the polarity of the signal from conductor 16, it is ascertained that the coil is, in fact, above conductor 16, and therefore, in the upper quarter of the tablet, namely somewhere between conductors 1 through 16. The next sampling is taken at, for example, conductor 8 and, by denoting the polarity it is ascertained that the coil lies within an area containing conductors 1–8. The next sampling occasions a measurement to be made of the signal on conductor 4 and by the polarity of the signal, it is determined the coil is, in fact, above conductor 4 and located somewhere between conductors 1 through 4. A measurement is then made of the signal at conductor 2 and by noting a different polarity from those previously measured, it is ascertained that, in fact, the coil is located below conductor 2. The equipment then samples conductor 3 and judging from the polarity of the sampled signal, it is ascertained that the coil is above conductor 3. Thus, with only six samples the course location of the coil (within two conductors) has been ascertained. This is contrasted to sampling all sixty-four conductors as in other systems.

Accordingly, it is now known that the coil lies between conductors 2 and 3. If the signals measured at conductors 2 and 3 are equal, then it is known that the coil is equally distant from conductors 2 and 3. However, if the signals are not equal then a ratio is taken of the signals obtained from the sampling of conductors 2 and 3, and this ratio is compared in a look-up table with values stored therein to determine the precise location of the coil. Since ratios are employed rather than absolute values of the signals sampled from conductors 2 and 3, the system is amplitude, frequency and phase insensitive. After determining the position of the coil with respect to conductors 1 through 64, the same procedure is carried out with respect to the Y direction conductors 65 through 128 to locate the coil precisely in the other direction.

Figure 2:
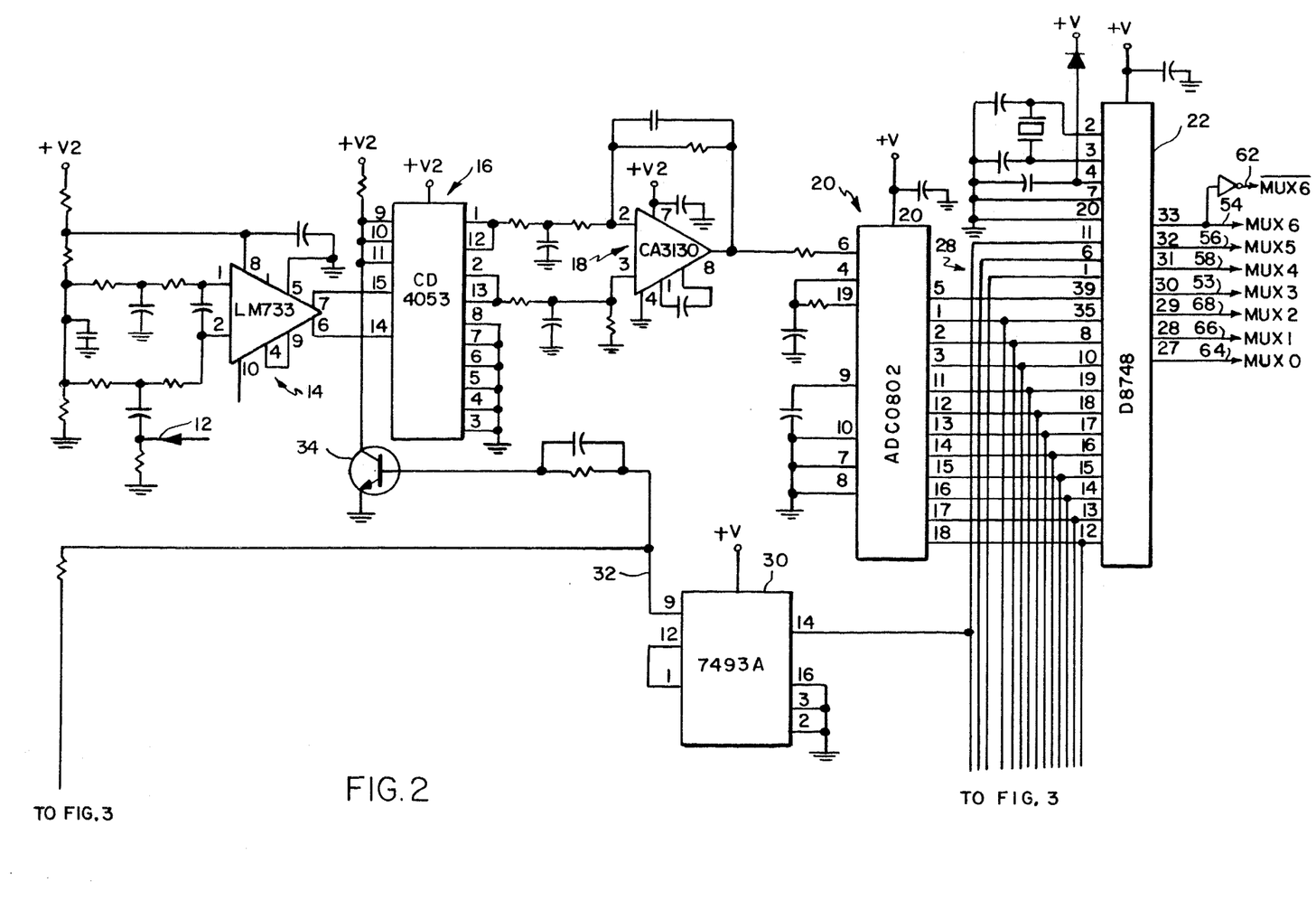
FIGS. 2 and 3 are circuit diagrams of a digitizer processor in accordance with the principles of this invention.
Figure 3:
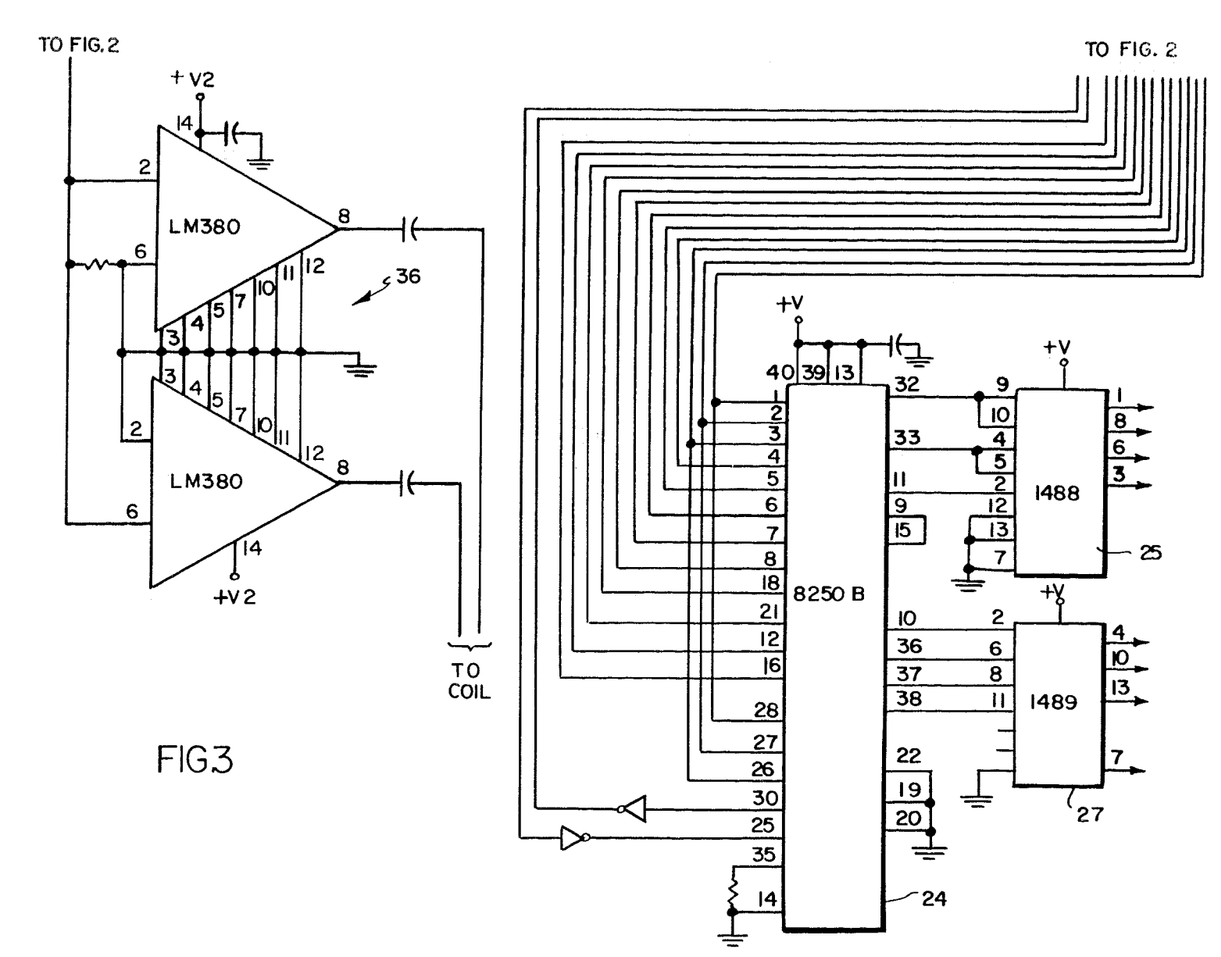
Figure 4:
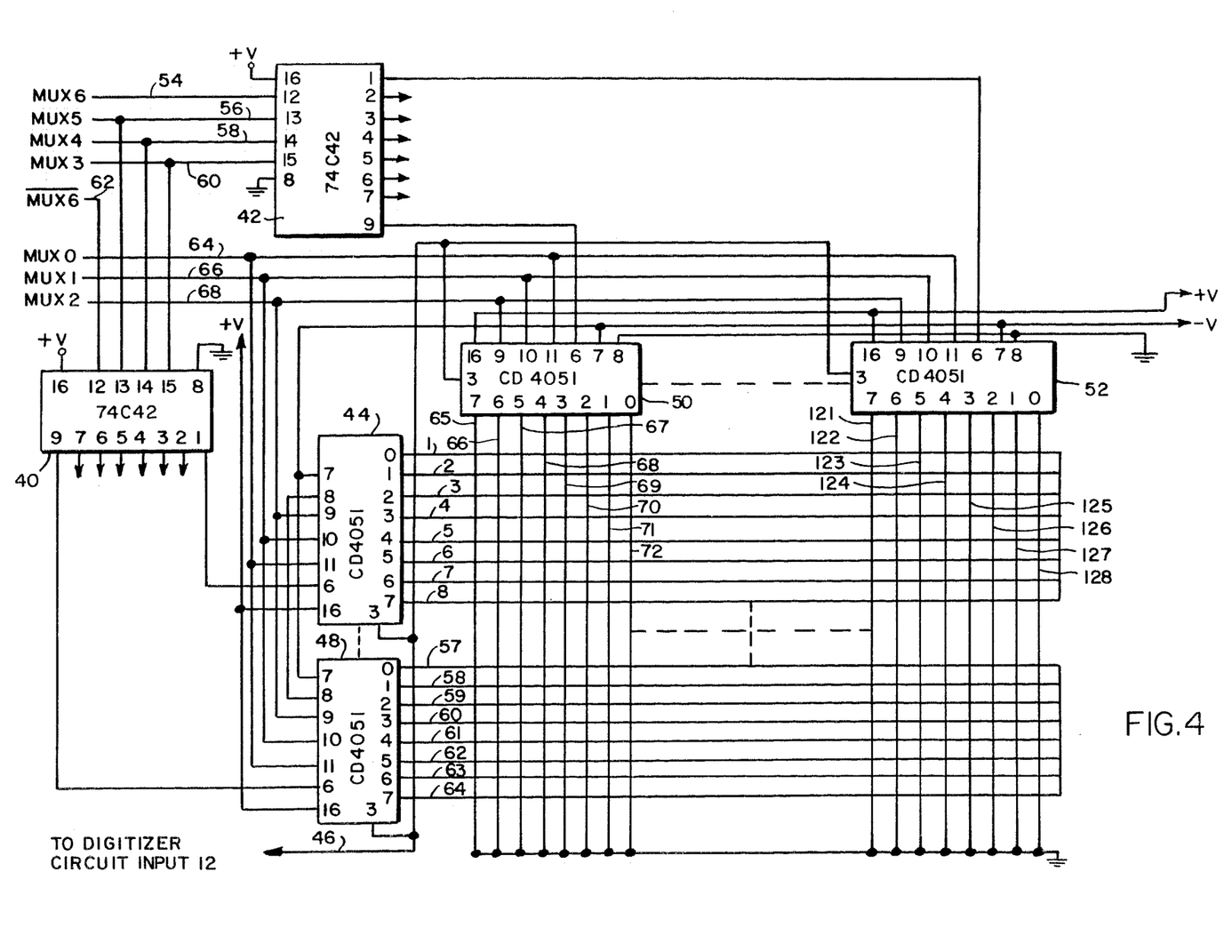
FIG. 4 is a diagram of a circuit for sampling the signals from the grid conductors of FIG. 1 to apply the signals therefrom to the circuit of FIGS. 2 and 3.

The circuitry for carrying out this procedure is set forth in FIGS. 2, 3 and 4. FIGS. 2 and 3 include all of the circuitry necessary except for the conductor sampling means which is employed to sample the necessary ones of the conductors 1 through 128, and this is shown in FIG. 4 of the drawings. The conductor sampling means connects conductors of the tablet to the circuitry of FIGS. 2 and 3.

In the example set forth above, the signals from conductors 64, 32, 16, 8, 4, 2 and 3 are successively applied to an input 12 of the digitizer circuit of FIGS. 2 and 3. Each of these signals is amplified and filtered at circuit 14 in order to provide proper operating signal levels for the system. The output from amplifier and filter circuit 14 is applied to a synchronous detector 16 to convert the input ac signal to a dc signal. The output from synchronous detector 16 is applied to an amplifier and smoothing filter 18. Circuit 18 smoothes any ripples in the output from the synchronous detector 16 and further amplifies the dc signal.

The output from the amplifier and smoothing filter circuit 18 is applied to an analog-to-digital converter 20 which converts the dc voltage output from circuit 18 to a binary number. This binary number is applied to a microprocessor 22. The binary number is utilized in the microprocessor 22 to determine which conductor of the tablet to sample next in accordance with the stored program therein. The output from microprocessor 22 at pins 27 through 33 are the addresses of the conductors of the tablet to be sampled and these are applied to the sampling circuit of FIG. 4. These are the addresses of the conductors to be connected to the input 12. The program stored in the microprocessor determines which conductor of the tablet to sample next as well as developing the ratios of the specific conductors to be compared to the values in the look-up table to determine the position of the coil in the X direction. Signals are also applied to input 12 from respective Y conductors to determine location of the coil in the Y direction as well. Connections from pins 1, 6, 8, 10–19, 35 and 39 of microprocessor 22 are coupled to a UART 24 to communicate with auxiliary equipment such as a computer or terminal. The outputs from UART 24 are taken from TTL to RS232C via interfaces 25 and 27.

An output 28 from the microprocessor is a 400 KHz signal which is applied to a divider 30 to divide the signal by four to provide a 100 KHz signal. This signal is applied via line 32 and transistor 34 to synchronous detector 16 as a reference input thereto. Transistor 34 converts and level shifts the signal from divider 30. The 100 KHz signal is also applied to a push-pull amplifier 36 with the outputs therefrom being applied to the coil to drive the coil in push-pull.

The circuit for sampling the sixty-four X (numbered 1–64) and the 64 Y (numbered 65–128) conductors is shown in FIG. 4. The circuit includes two one-of-eight selectors 40 and 42 and sixteen switching circuits, eight for switching to or sampling appropriate X conductors and eight for switching to or sampling appropriate Y conductors, only two of each being shown, for simplicity of explanation.

A switching circuit 44 connects a selected one of the X conductors 1–8 to the input 12 of the circuit of FIGS. 2 and 3 via a line 46 and a switching circuit 48 connects a selected one of the X conductors 49–64 to the same input via line 46. Similar switching circuits (not shown) are employed to connect selected ones of the conductors 9–48 to the input 12.

Switching circuit 50 is employed to connect a selected one of the Y conductors 65–72 to input 12 via line 46 and switching circuit 52 is used to connect a selected one of the Y conductors 121–128 to input 12 via line 46. Other switching circuits (not shown) are employed to connect selected ones of the conductors 73–120 to the input 12.

The inputs to the sampling circuit of FIG. 4 are received from the output of microprocessor 22 along lines 54, 56, 58, 60, 62, 64, 66 and 68. The input along line 54 indicates that Y conductors are to be sampled and is thus applied to the one-of-eight selector 42 for the Y conductors. The input at line 62 denotes that X conductors are to be sampled and is accordingly coupled to the one-of-eight selector 40 for the X conductors.

The one-of-eight selector 40 determines which of the eight X conductor switching circuits, including switching circuits 44 and 48, is to be enabled while the one-of-eight selector 42 selects the appropriate one of the eight switching circuits for the Y conductors, including switching circuits 50 and 52. This selection of an appropriate switching circuit is made by the selectors 40 and 42 in accordance with address command received from microprocessor 22 along lines 56, 58 and 60 which is coupled to both of the selectors 40 and 42.

The other inputs to the sampling circuit from the microprocessor is the input on lines 64, 66 and 68. These inputs are applied to all of the switching circuits including switching circuits 44, 48, 50 and 52, and selects which of the eight conductors coupled to a particular switching circuit is to be coupled to the output line 46.

The computer program for operating microprocessor 22 is written in assembly language and is as follows:

```
                 8048 ASSEMBLER

;           SYSTEM EQUATES
                 ;
                 ;           WIRE INFORMATION
0020             XMID   EQU     20H             ;ADDR OF X MIDDLE WIRE
00A0             YMID   EQU     0A0H            ;ADDR OF Y MIDDLE WIRE
0020             OFFSET EQU     20H             ;WIRE # OFFSET VALUE
                 ;          WIRE VOLTAGE STORAGE ADDRESS
0020             VOLT   EQU     20H             ;ADDR OF VOLT RAM STORAGE
                 ;          POINT PARAMETERS STORAGE ADDRESSES
0022             XPAR   EQU     22H             ;X PARAMETERS STORAGE ADDR
0025             YPAR   EQU     25H             ;Y PARAMETERS STORAGE ADDR
                 ;          VOLTAGE BIAS
0080             BIAS   EQU     080H            ;WIRE OFFSET VOLTAGE
                 ;
                 ;
                 ;
0000                    ORG     0
0000  0409              JMP     INIT
                 ;
0003                    ORG     3H
0003  15                DIS     I
0004  93                RETR
0007                    ORG     7H;

0007  35                DIS     TCNTI
0008  93         FSRET: RETR
0009  C5         INIT:  SEL     RB0
000A  15                DIS     I
000B  35                DIS     TCNTI
000C  1408             CALL     FSRET           ;RESET INT-IN-PROG FLAG
000E  75                ENT0    CLK             ;ENABLE CLOCK TO UART
000F  8A10              ORL     P2,#10H         ;SELECT UART
```

```
0011 B903            MOV     R1,#3
0013 2380            MOV     A,#80H          ;SELECT DLAB
0015 91              MOVX    @R1,A
0016 B800            MOV     R0,#0           ;SELECT 9600 BAUD
0018 230C            MOV     A,#0CH
001A 90              MOVX    @R0,A
001B 18              INC     R0
001C 27              CLR     A
001D 90              MOVX    @R0,A
001E 2303            MOV     A,#3            ;SELECT 8 BITS, ETC.
0020 91              MOVX    @R1,A
0021 B904            MOV     R1,#4
0023 27              CLR     A
0024 91              MOVX    @R1,A
0025 90              MOVX    @R0,A
0026 2400            JMP     MAIN

;               EXPLANATION OF STRATEGY
;
;       THERE ARE 2 STATES, EACH REQUIRING DIFFERENT PROCESSING.
;
;                       STATE A - POS VALUE < ABS NEG VALUE
;                       STATE B - POS VALUE > OR = ABS NEG VALUE
;
; STATE A, DISTANCE = # OF POS WIRE*200 MILS+LOOK UP TABLE VAL
; STATE B, DISTANCE = # OF POS WIRE * 200 MILS + 199 - LUTV
;
;
0100                 ORG     100H
0100 A5      MAIN:   CLR     F1              ;RESET X/Y FLAG(SELECT X AXIS)
0101 BC20            MOV     R4,#XMID        ;GET MIDDLE X WIRE #
0103 85      LOOP0:  CLR     F0              ;RESET SIGN FLAG
0104 BD20            MOV     R5,#OFFSET      ;GET INITIAL OFFSET #
0106 BE05            MOV     R6,#5           ;SET UP LOOP COUNTER
0108 FD      LOOP1:  MOV     A,R5            ;GET OFFSET #
0109 97              CLR     C
010A 67              RRC     A               ;/2 OFFSET #
010B AD              MOV     R5,A            ;SAVE NEW OFFSET #
010C 546C            CALL    OUTWRE          ;TURN ON WIRE #,CONVERT
010E FC              MOV     A,R4            ;GET WIRE #
010F F616            JC      INCWRE          ;IF + VOLT,INCR WIRE #
0111 37      DECWRE: CPL     A               ;SUBTRACT OFFSET #
0112 6D              ADD     A,R5
0113 37              CPL     A
0114 2417            JMP     CONT0           ;CONTINUE
0116 6D      INCWRE: ADD     A,R5            ;ADD OFFSET #
0117 AC      CONT0:  MOV     R4,A            ;SAVE LATEST WIRE #
0118 EE08            DJNZ    R6,LOOP1        ;DEC AND LOOP
011A FC              MOV     A,R4            ;SAVE WIRE # IN R1
011B A9              MOV     R1,A
011C 546C            CALL    OUTWRE          ;TURN ON LATEST WIRE #,CONVERT
011E B820            MOV     R0,#VOLT        ;GET VOLT STORAGE ADDR
0120 F629            JC      PLUS            ;IF VOLT AT WIRE # +,JUMP
0122 37      MINUS:  CPL     A               ;SAVE ABS VAL OF VOLT (#)
0123 A0              MOV     @R0,A
0124 CC              DEC     R4              ;POINT TO WIRE #-1
0125 FC              MOV     A,R4            ;SAVE IT AS LAST WIRE #
0126 A9              MOV     R1,A
0127 242C            JMP     CONT1           ;CONTINUE
0129 A0      PLUS:   MOV     @R0,A           ;SAVE VOLTAGE (#) ADDR
012A 95              CPL     F0              ;SET SIGN FLAG
012B 1C              INC     R4              ;POINT TO WIRE #+1
012C 546C    CONT1:  CALL    OUTWRE          ;TURN ON WIRE #+1,CONVERT
012E B632            JF0     ABS2            ;TAKE ABS VAL,VOLT(#+1)
0130 2433            JMP     CONT2           ;CONTINUE
0132 37      ABS2:   CPL     A               ;TAKE ABS VAL OF VOLTAGE
0133 B821    CONT2:  MOV     R0,#VOLT+1      ;SAVE ABS VOLT OF WIRE#+/-1
0135 A0              MOV     @R0,A
0136 B63B            JF0     CONT3           ;CONTINUE
0138 C8              DEC     R0              ;POINT TO VOLT (#)
0139 243F            JMP     CONT4           ;CONTINUE
013B B820    CONT3:  MOV     R0,#VOLT        ;DO VOLT(#)-(#+1)
013D F0              MOV     A,@R0
013E 18              INC     R0              ;POINT TO VOLT (#+1)
```

```
013F 37      CONT4:  CPL   A                   ;SUBTR ABS NEG VOLT
0140 60              ADD   A,@R0
0141 37              CPL   A
0142 F649            JC    LARNEG              ;IF CARRY,[NEG] VOLT> POS VOLT
0144 5416    LARPOS: CALL  LGEPOS              ;SOLVE FOR RATIO=(NEG*256)/POS
0146 85              CLR   F0                  ;RESET SIGN FLAG
0147 244D            JMP   CONT5               ;CONTINUE
0149 542D    LARNEG: CALL  LGENEG              ;SOLVE FOR RATIO=(POS*256)/NEG
014B 85              CLR   F0                  ;SET SIGN FLAG
014C 95              CPL   F0
014D AA      CONT5:  MOV   R2,A
014E BB00            MOV   R3,#00H             ;CLEAR SIGN FLAG(+SIGN)
0150 B654            JF0   CONT6               ;CONTINUE
0152 BBFF            MOV   R3,#0FFH            ;SET SIGN REG (- SIGN)
0154 765A    CONT6:  JF1   SAVY                ;F1 SET,SAVE Y PARAMETERS
0156 B822            MOV   R0,#XPAR            ;GET X PARAMETERS ADDR
0158 245C            JMP   SAVPAR              ;SAVE THE PARAMETERS
015A B825    SAVY:   MOV   R0,#YPAR            ;GET Y PARAMETRS ADDR
015C F9      SAVPAR: MOV   A,R1                ;GET WIRE #
015D A0              MOV   @R0,A               ;SAVE IT
015E 18              INC   R0
015F FA              MOV   A,R2                ;GET RATIO
0160 A0              MOV   @R0,A               ;SAVE IT
0161 18              INC   R0
0162 FB              MOV   A,R3                ;GET SIGN BYTE
0163 A0              MOV   @R0,A               ;SAVE IT
0164 766B            JF1   PRINT               ;F1 SET,Y COORD JUST COMPLETED
0166 B5              CPL   F1                  ;SET X/Y FLAG
0167 BCA0            MOV   R4,#YMID            ;GET MIDDLE Y WIRE
0169 2403            JMP   LOOP0               ;SEARCH FOR Y COORD
             ;
016B 5450    PRINT:  CALL  CRLF
016D BB24            MOV   R0,#XPAR+2          ;PRINT X COORDINATE
016F 347C            CALL  OUTPUT
0171 BB2C            MOV   R3,#',,'
0173 5402            CALL  OUTCH
0175 BB27            MOV   R0,#YPAR+2          ;PRINT Y COORDINATE
0177 A5              CLR   F1                  ;SET FLAG FOR Y COORDINATES
0178 347C            CALL  OUTPUT
017A 2400            JMP   MAIN                ;DO IT ALL AGAIN
             ;
017C F0      OUTPUT: MOV   A,@R0               ;GET SIGN
017D C8              DEC   R0
017E C8              DEC   R0                  ;POINT TO WIRE #
017F F28C            JB7   SIGNEG              ;JUMP IF SIGN WAS NEGATIVE
0181 F0      SIGNPS: MOV   A,@R0               ;GET WIRE #
0182 549B            CALL  COARSE              ;PRINT TENS, ONES, DEC. POINT
0184 5402            CALL  OUTCH               ;PRINT TENTHS
0186 18              INC   R0                  ;POINT TO QUOTIENT
0187 F0              MOV   A,@R0               ;GET QUOTIENT
0188 E3              MOVP3 A,@A                ;LOOK UP CORR DISP IN TABLE
0189 5464            CALL  HEXASC              ;PRINT HUNDRENTHS, THOUSANDTHS
018B 83              RET
             ;
018C F0      SIGNEG: MOV   A,@R0               ;GET WIRE #
018D 549B            CALL  COARSE
018F 1B              INC   R3                  ;ADVANCE TO NEXT WIRE
0190 5402            CALL  OUTCH
0192 18              INC   R0
0193 F0              MOV   A,@R0
0194 E3              MOVP3 A,@A
0195 37              CPL   A                   ;SUBT VALUE FROM NEXT WIRE POS
0196 17              INC   A
0197 0399            ADD   A,#99H
0199 5464            CALL  HEXASC
019B 83              RET
0200                 ORG   200H
0200 BB20    SPACE:  MOV   R3,#' '
0202 8A10    OUTCH:  ORL   P2,#10H             ;SELECT UART
0204 B905            MOV   R1,#5
0206 81              MOVX  A,@R1
0207 9AEF            ANL   P2,#0EFH            ;DESELECT UART
0209 B20D            JB5   NOTBSY
020B 4402            JMP   OUTCH               ;LOOP TILL UART NOT BUSY
```

```
020D 8A10      NOTBSY: ORL   P2,#10H         ;SELECT UART
020F B900              MOV   R1,#0
0211 FB                MOV   A,R3             ;GET CHARACTER TO BE PRINTED
0212 91                MOVX  @R1,A            ;PRINT IT
0213 9AEF              ANL   P2,#0EFH         ;DESELECT UART
0215 83                RET
                ;
                ;
0216 B61F      LGEPOS: JFO   OK2              ;IF +,RVSE POS & NEG VOLT(ST B
0218 B820              MOV   R0,#VOLT         ;GET VOLTS ADDR
021A F0                MOV   A,@R0            ;GET ABS NEG INTO R4
021B AC                MOV   R4,A
021C 18                INC   R0               ;POINT TO POS VOLT ADDR
021D 4424              JMP   OK3              ;CONTINUE
021F B821      OK2:    MOV   R0,#VOLT+1       ;GET VOLT (#+/-1) ADDR
0221 F0                MOV   A,@R0            ;GET ABS NEG INTO R4
0222 AC                MOV   R4,A
0223 C8                DEC   R0               ;POINT TO POS VOLT ADDR
0224 F0        OK3:    MOV   A,@R0            ;SAVE POS VOLT IN R5
0225 AD                MOV   R5,A
0226 5475              CALL  DIV16            ;RATIO=(NEG*256)/POS
0228 E62C              JNC   OK4
022A 23FF              MOV   A,#0FFH          ;
022C 83        OK4:    RET
                ;
                ;
                ;       PRINTS ASCII CHARACTER IN R3.  R7 (RB1) DESTROYED.
                ;
                ;
                ;
022D B636      LGENEG: JFO   ON2              ;STATE A
022F B821              MOV   R0,#VOLT+1       ;POINT TO VOLT (#+/-1) ADDR
0231 F0                MOV   A,@R0            ;GET POS VOLT INTO R4
0232 AC                MOV   R4,A
0233 C8                DEC   R0               ;POINT TO VOLT (#) ADDR
0234 443B              JMP   ON3              ;CONTINUE
0236 B820      ON2:    MOV   R0,#VOLT         ;POINT TO VOLT (#) ADDR
0238 F0                MOV   A,@R0            ;GET POS VOLT INTO R4
0239 AC                MOV   R4,A
023A 18                INC   R0               ;POINT TO VOLT (#+/-1) ADDR
023B F0        ON3:    MOV   A,@R0            ;GET ABS NEG VOLT INTO R5
023C AD                MOV   R5,A
023D 5475              CALL  DIV16            ;RATIO=(POS*256)/NEG
023F 83                RET
                ;
                ;
                ;       CONVERTS LOWER 4 BITS IN ACC TO ASCII CHARACTER AND
                ;       PRINTS IT.  R3, ACC DESTROYED.
                ;
0240 530F      ASCII:  ANL   A,#0FH           ;MASK IN LOWER 4 BITS
0242 0330              ADD   A,#30H           ;CONVERT TO ASCII
0244 AB                MOV   R3,A             ;ADJUST RESULT IF 3A TO 3F
0245 03C6              ADD   A,#0C6H
0247 FB                MOV   A,R3
0248 E64C              JNC   OK
024A 0307              ADD   A,#7
024C AB        OK:     MOV   R3,A
024D 5402              CALL  OUTCH            ;PRINT ASCII CHAR
024F 83                RET
                ;
                ;
                ;       PRINTS CR, LF.  ACC DESTROYED.
                ;
0250 BB0D      CRLF:   MOV   R3,#0DH          ;LOAD CR
0252 5402              CALL  OUTCH            ;PRINT IT
0254 BB0A              MOV   R3,#0AH          ;LOAD LF
0256 5402              CALL  OUTCH
0258 83                RET
                ;
                ;
                ;       STARTS A/D CONVERTER, WAITS, EXITS WITH RESULT IN ACC.
                ;
```

```
0259 9AEF      ADCONV: ANL    P2,#0EFH        ;SELECT A/D
025B 90               MOVX   @R0,A           ;START CONVERTER
025C 5656             JT1    $               ;WAIT
025E 80               MOVX   A,@R0           ;GET DATA
025F 8A10             ORL    P2,#10H         ;DESELECT A/D
0261 0380             ADD    A,#BIAS         ;OFFSET THE VOLTAGE
0263 83               RET
              ;
              ;
              ;       MOVES A BYTE INTO 2 NIBBLES AND PRINTS THEM.  ENTER W/
              ;       DATA IN ACC.  ACC, R3, R4 DESTROYED.
              ;
0264 AC       HEXASC: MOV    R4,A
0265 47               SWAP   A               ;GET UPPER NIBBLE
0266 5440             CALL   ASCII           ;CONVERT AND PRINT
0268 FC               MOV    A,R4
0269 5440             CALL   ASCII           ;CONVERT AND PRINT LOWER NIB
026C FC 026B 83       RET
026D 39
026E BF
0270 FF               ;       OUTPUTS WIRE ADDRESS AND WAITS FOR SETTLING
0272 54               ;
0274 83               CALL   ADCONV          ;DO A/D CONV
                      RET
              ;
              ;
              ;       16 BY 8 DIVIDE ROUTINE
              ;       AT ENTRY,
              ;           ACC = LOWER 8 BITS OF DIVIDEND
              ;           R4 = UPPER 8 BITS OF DIVIDEND
              ;           R5 = DIVISOR
              ;       AT EXIT,
              ;           ACC = 8 BITS OF RESULT
              ;           R4 = REMAINDER
              ;           R5,R7 DESTROYED
              ;
0275 2C       DIV16:  XCH    A,R4
0276 BF08             MOV    R7,#8
0278 37               CPL    A
0279 6D               ADD    A,R5
027A 37               CPL    A
027B F680             JC     DIVIA
027D A7               CPL    C
027E 4499             JMP    DIVIB
0280 6D       DIVIA:  ADD    A,R5
0281 97       DIVILP: CLR    C
0282 2C               XCH    A,R4
0283 F7               RLC    A
0284 2C               XCH    A,R4
0285 F7               RLC    A
0286 E68D             JNC    DIVIE
0288 37               CPL    A
0289 6D               ADD    A,R5
028A 37               CPL    A
028B 4495             JMP    DIVIC
028D 37       DIVIE:  CPL    A
028E 6D               ADD    A,R5
028F 37               CPL    A
0290 E695             JNC    DIVIC
0292 6D               ADD    A,R5
0293 4496             JMP    DIVID
0295 1C       DIVIC:  INC    R4
0296 EF81     DIVID:  DJNZ   R7,DIVILP
0298 97               CLR    C
0299 2C       DIVIB:  XCH    A,R4
029A 83               RET
              ;
              ;
029B 769F     COARSE: JF1    XCOORD
```

```
029D 03C0              ADD    A,#-40H      ;OFFSET WIRE # IF Y COORD
029F BBFF      XCOORD: MOV    R3,#0FFH     ;CLEAR INCH COUNTER - 1
02A1 1B        LOOP3:  INC    R3           ;COUNT INCHES IN R3
02A2 03FB              ADD    A,#-5
02A4 F6A1              JC     LOOP3
02A6 0305              ADD    A,#5         ;RESTORE DATA
02A8 97                CLR    C            ;MULT BY TWO
02A9 F7                RLC    A            ;ACC = .0, .2, .4, .6, .8
02AA AD                MOV    R5,A         ;STORE TENTHS IN R5
02AB FB                MOV    A,R3         ;GET TENS AND ONES
02AC 03F6              ADD    A,#-10       ;CONVERT TO BCD
02AE E6B2              JNC    OK1
02B0 0306              ADD    A,#6
02B2 030A      OK1:    ADD    A,#10
02B4 5464              CALL   HEXASC       ;PRINT TENS AND ONES
02B6 BB2E              MOV    R3,#'.'      ;PRINT DECIMAL POINT
02B8 5402              CALL   OUTCH
02BA FD                MOV    A,R5         ;GET TENTHS
02BB 0330              ADD    A,#30H       ;CONVERT TO ASCII
02BD AB                MOV    R3,A         ;PUT TENTHS INTO R3
02BE 83                RET
0300                   ORG    300H
                ;
                ;       100 MIL DATA TABLE
                ;       PEN CALIBRATION
                ;
0300 00000101          DB     0,0,1,1,2,2,3,3,4,4,5,5,6,6,7,7
0310 07080809          DB     7,8,8,9,9,10H,10H,11H
0318 11121213          DB     11H,12H,12H,13H,13H,14H,14H,15H
0320 15161617          DB     15H,16H,16H,17H,17H,18H,18H,18H
0328 19192020          DB     19H,19H,20H,20H,21H,21H,22H,22H
0330 23232424          DB     23H,23H,24H,24H,24H,25H,25H,26H
0338 26272727          DB     26H,27H,27H,27H,28H,28H,29H,29H
0340 30303131          DB     30H,30H,31H,31H,32H,32H,32H,33H
0348 33343435          DB     33H,34H,34H,35H,35H,36H,36H,36H
0350 37373838          DB     37H,37H,38H,38H,39H,39H,40H,40H
0358 40414142          DB     40H,41H,41H,42H,42H,43H,43H,43H
0360 44444545          DB     44H,44H,45H,45H,46H,46H,46H,47H
0368 47484848          DB     47H,48H,48H,48H,49H,49H,50H,50H
0370 51515152          DB     51H,51H,51H,52H,52H,53H,53H,53H
0378 54545555          DB     54H,54H,55H,55H,55H,56H,56H,57H
0380 57575858          DB     57H,57H,58H,58H,59H,59H,59H,60H
0388 60616161          DB     60H,61H,61H,61H,62H,62H,62H,63H
0390 63646464          DB     63H,64H,64H,64H,65H,65H,66H,66H
0398 66676767          DB     66H,67H,67H,67H,68H,68H,68H,69H
03A0 69707070          DB     69H,70H,70H,70H,71H,71H,71H,72H
03A8 72727373          DB     72H,72H,73H,73H,74H,74H,74H,75H
03B0 75757676          DB     75H,75H,76H,76H,76H,77H,77H,77H
03B8 78787879          DB     78H,78H,78H,79H,79H,79H,80H,80H
03C0 80818181          DB     80H,81H,81H,81H,82H,82H,82H,83H
03C8 83838484          DB     83H,83H,84H,84H,84H,85H,85H,85H
03D0 86868687          DB     86H,86H,86H,87H,87H,87H,88H,88H
03D8 88888989          DB     88H,88H,89H,89H,89H,90H,90H,90H
03E0 91919191          DB     91H,91H,91H,91H,92H,92H,92H,93H
03E8 93939394          DB     93H,93H,93H,94H,94H,94H,95H,95H
03F0 95959696          DB     95H,95H,96H,96H,96H,97H,97H,97H
03F8 97989898          DB     97H,98H,98H,98H,98H,99H,99H,99H
0000                   END
```

While I have described above the principles of my invention in conjunction with specific apparatus, it is to be clearly understood that this description is made only by way of example and not as a limitation of the scope of my invention as set forth in the accompanying claims.

I claim:

1. Apparatus for determining the position of a transmitting coil with respect to a grid of spaced parallel conductors located adjacent to the transmitting coil, comprising:

means for sampling the signals induced in only a selected small percentage of the conductors so as to successively reduce the possible position of the coil to smaller and smaller areas until the position is determined to be intermediate two of the conductors; and means responsive to the signals induced in the two conductors to determine the precise position of the coil.

2. Apparatus as defined in claim 1, wherein said sampling means includes means for sampling the signal induced in a first of the conductors located in substantially the middle of the grid so as to determine that the coil is located in one particular half of the grid.

3. Apparatus as defined in claim 2, wherein said sampling means includes means for sampling the signal induced in a second of the conductors located in substantially the middle of the half of the grid determined to contain the coil so as to determine that the coil is located in one particular quarter of the grid.

4. Apparatus as defined in claim 3, wherein said sampling means includes means for sampling the signal induced in other conductors to further reduce the area in which the coil is located to an area intermediate two conductors.

5. Apparatus as defined in claim 4, wherein said sampling means includes means for making successive determinations of the course position of the coil prior to determining which of the other conductors are to be sampled.

6. Apparatus as defined in claim 1, wherein said means responsive includes means for establishing a ratio of the signals induced in the two conductors and means for comparing the ratio with predetermined ratios indicative of precise coil position location.

7. Apparatus as defined in claim 1, wherein said sampling means includes means for ascertaining the polarity of the signals induced in the conductors to denote on which side of a sampled conductor the coil is located.

8. Apparatus for determining the position of a transmitting coil with respect to a pair of spaced parallel conductors located adjacent to the transmitting coil, comprising:

means for measuring the signals induced in each of the conductors;

means for establishing a ratio of the signals induced in the conductors; and means for comparing the ratio with a listing of predetermined ratios indicative of precise coil position location.

9. Apparatus for determining the position of a transmitting coil with respect to a plurality of spaced parallel conductors located adjacent to the transmitting coil, comprising:

means for sampling the voltage induced in a first one of the parallel conductors so as to determine on which side of the first conductor the coil is located thereby eliminating any necessity of sampling the voltage induced in any of the parallel conductors on the other side of the first conductor which does not contain the coil;

means for sampling the voltage induced in a second of the parallel conductors located on the side of the first conductor which contains the coil so as to determine on which side of the second conductor the coil is located thereby eliminating any of the parallel conductors on the other side of the second conductor which does not contain the coil;

means for sampling the voltage induced in selected others of the parallel conductors so as to coarsely locate the coil as being between two particular conductors;

means for generating a ratio of the voltages induced in said two particular conductors; and means for comparing said ratio with a predetermined set of ratios to determine the fine position of the coil.

10. Apparatus for determining the position of a transmitting coil with respect to a plurality of spaced parallel conductors located adjacent to the transmitting coil, comprising:

means for sampling the voltage induced in a first one of the parallel conductors which is near the middle of the plurality of conductors so as to determine on which side of the first conductor the coil is located thereby eliminating any necessity of sampling the voltage induced in any of the substantially half of the conductors located on the side of the first conductor which does not contain the coil;

means for sampling the voltage induced in a second of the parallel conductors which is near the middle of the parallel conductors located on the side of the first conductor which contains the coil so as to determine on which side of the second conductor the coil is located thereby eliminating any necessity of sampling the voltage induced in any of the substantially quarter of the conductors located on the side of the second conductor which does not contain the coil;

means for sampling the voltage induced in selected others of the parallel conductors so as to coarsely locate the coil as being between two particular conductors;

means for generating a ratio of the voltages induced in said two particular conductors; and means for comparing said ratio with a predetermined set of ratios to determine the fine position of the coil.

11. A method for determining the position of a transmitting coil with respect to a grid of spaced parallel conductors located adjacent to the transmitting coil, comprising the steps of:

sampling the signals induced in only a selected small percentage of the conductors so as to successively reduce the possible position of the coil to smaller and smaller areas until the position is determined to be intermediate two of the conductors; and responding to the signals induced in the two conductors to determine the precise position of the coil.

12. The method as defined in claim 11, wherein said sampling step includes sampling the signal induced in a first of the conductors located in substantially the middle of the grid so as to determine that the coil is located in one particular half of the grid.

13. The method as defined in claim 12, wherein said sampling step includes sampling the signal induced in a second of the conductors located in substantially the middle of the half of the grid determined to contain the coil so as to determine that the coil is located in one particular quarter of the grid.

14. The method as defined in claim 13, wherein said sampling step includes sampling the signal induced in other conductors to further reduce the area in which the coil is located to an area intermediate two conductors.

15. The method as defined in claim 14, wherein said sampling step includes means for successively determining the coarse position of the coil prior to determining which of the other conductors are to be sampled.

16. The method as defined in claim 11, wherein said responding step includes establishing a ratio of the signals induced in the two conductors and comparing the ratio with predetermined ratios indicative of precise coil position location.

17. The method as defined in claim 11, wherein said sampling step includes ascertaining the polarity of the signals induced in the conductors to denote on which side of a conductor the coil is located.

18. A method for determining the position of a transmitting coil with respect to a pair of spaced parallel conductors located adjacent to the transmitting coil, comprising the steps of:
measuring the signals induced in each of the conductors;
establishing a ratio of the signals induced in the conductors; and
comparing the ratio with a listing of predetermined ratios indicative of precise coil position locations.

19. A method for determining the position of a transmitting coil with respect to a plurality of spaced parallel conductors located adjacent to the transmitting coil, comprising the steps of:
sampling the voltage induced in a first one of the parallel conductors so as to determine on which side of the first conductor the coil is located thereby eliminating any necessity of sampling the voltage induced in any of the parallel conductors on the other side of the first conductor which does not contain the coil;
sampling the voltage induced in a second of the parallel conductors located on the side of the first conductor which contains the coil so as to determine on which side of the second conductor the coil is located thereby eliminating any necessity of sampling the voltage induced in any of the parallel conductors on the other side of the second conductor which does not contain the coil;
sampling the voltage induced in selected others of the parallel conductors so as to coarsely locate the coil as being between two particular conductors;
generating a ratio of the voltages induced in said two particular conductors; and
comparing said ratio with a predetermined set of ratios to determine the fine position of the coil.

20. A method for determining the position of a transmitting coil with respect to a plurality of spaced parallel conductors located adjacent to the transmitting coil, comprising the steps of:
sampling the voltage induced in a first one of the parallel conductors which is near the middle of the plurality of conductors so as to determine on which side of the first conductor the coil is located thereby eliminating any necessity of sampling the voltage induced in any of the substantially half of the conductors located on the side of the first conductor which does not contain the coil;
sampling the voltage induced in a second of the parallel conductors which is near the middle of the parallel conductors located on the side of the first conductor which contains the coil so as to determine on which side of the second conductor the coil is located thereby eliminating any necessity of sampling the voltage induced in any of the substantially quarter of the conductors located on the side of the second conductor which does not contain the coil; sampling the voltage induced in selected others of the parallel conductors so as to coarsely locate the coil as being between two particular conductors;
generating a ratio of the voltages induced in said two particular conductors; and
comparing said ratio with a predetermined set of ratios to determine the fine position of the coil.

* * * * *

REEXAMINATION CERTIFICATE (2020th)
United States Patent [19]
Bergeron

[11] B1 4,423,286
[45] Certificate Issued May 25, 1993

[54] APPARATUS AND METHOD FOR DETERMINING THE POSITION OF A DRIVEN COIL WITHIN A GRID OF SPACED CONDUCTORS

[75] Inventor: Gary A. Bergeron, Phoenix, Ariz.

[73] Assignee: Calcomp Inc., Anaheim, Calif.

Reexamination Request:
No. 90/002,735, May 21, 1992

Reexamination Certificate for:
Patent No.: 4,423,286
Issued: Dec. 27, 1983
Appl. No.: 400,511
Filed: Jul. 21, 1982

[51] Int. Cl.$^5$ .............................................. G08C 21/00
[52] U.S. Cl. ...................................................... 178/19
[58] Field of Search ................... 178/18, 19, 170, 87; 33/1 M; 364/518, 520

[56] References Cited

U.S. PATENT DOCUMENTS

| | | |
|---|---|---|
| 1,440,310 | 10/1873 | Hiruta et al. . |
| 1,738,297 | 10/1925 | Hoffman . |
| 2,565,612 | 8/1951 | Levin . |
| 2,685,611 | 8/1954 | Taylor . |
| 2,866,124 | 12/1958 | Giuffrida et al. . |
| 2,900,466 | 8/1959 | McLaughlin et al. . |
| 2,902,607 | 9/1959 | Hedger et al. . |
| 2,907,824 | 10/1959 | Peek, Jr. . |
| 2,973,140 | 2/1961 | Katz . |
| 3,018,475 | 1/1962 | Kleist et al. . |
| 3,063,018 | 11/1962 | Gordon et al. . |
| 3,178,018 | 4/1965 | Harpell . |
| 3,290,495 | 12/1966 | Malmros . |
| 3,304,612 | 2/1967 | Proctor et al. . |
| 3,342,935 | 9/1967 | Leifer et al. . |
| 3,358,151 | 12/1967 | Haase . |
| 3,399,401 | 8/1968 | Ellis et al. . |
| 3,440,522 | 4/1969 | Kruse . |
| 3,440,643 | 4/1969 | Tager . |
| 3,461,454 | 8/1969 | Steckenrider . |
| 3,466,646 | 9/1969 | Lewin . |
| 3,530,241 | 11/1967 | Ellis . |
| 3,535,447 | 10/1970 | Wollrich . |
| 3,551,820 | 12/1970 | Bagwell . |
| 3,582,962 | 6/1971 | Mazza . |
| 3,591,718 | 7/1971 | Asamo . |
| 3,598,903 | 8/1971 | Johnson et al. . |
| 3,618,019 | 11/1971 | Nemirovsky et al. . |
| 3,624,293 | 11/1971 | Baxter . |
| 3,624,583 | 11/1971 | Nakada . |
| 3,624,584 | 11/1971 | Ohno . |
| 3,626,350 | 12/1971 | Suzuki . |
| 3,631,442 | 12/1971 | Fearon . |
| 3,636,256 | 1/1972 | Cameron . |
| 3,647,963 | 3/1972 | Bailey . |
| 3,668,313 | 6/1972 | Dym . |
| 3,670,103 | 6/1972 | Baxter et al. . |
| 3,684,825 | 8/1972 | Dischert et al. . |
| 3,689,885 | 9/1972 | Kaplan et al. . |
| 3,699,253 | 10/1972 | Freedman . |
| 3,699,492 | 10/1972 | Yoshihara . |
| 3,705,956 | 12/1972 | Dertouzos . |
| 3,713,148 | 1/1973 | Cardullo et al. . |
| 3,725,760 | 4/1973 | Bailey . |
| 3,732,369 | 5/1973 | Cotter . |
| 3,732,557 | 5/1973 | Evans et al. . |
| 3,735,044 | 5/1973 | Centner et al. . |
| 3,745,569 | 7/1973 | Works et al. . |
| 3,767,858 | 10/1973 | Rodgers . |
| 3,783,392 | 1/1974 | Drake et al. . |
| 3,789,391 | 1/1974 | Brock et al. . |
| 3,801,733 | 4/1974 | Bailey . |
| 3,806,912 | 4/1974 | Eckert et al. . |
| 3,818,133 | 6/1974 | Cotter . |
| 3,819,857 | 6/1974 | Inokuchi . |
| 3,828,128 | 8/1974 | Delthoff et al. . |
| 3,832,693 | 8/1974 | Ishizake et al. . |
| 3,832,693 | 8/1974 | Ishizaki et al. ......................... 178/19 |
| 3,846,580 | 11/1974 | Brenner . |
| 3,851,097 | 11/1974 | Rodgers . |
| 3,865,977 | 2/1975 | Hiraki et al. . |
| 3,873,770 | 3/1975 | Ioannou . |
| 3,886,311 | 5/1975 | Rodgers et al. . |
| 3,895,288 | 7/1975 | Lampen et al. . |
| 3,904,822 | 9/1975 | Kamm et al. . |
| 3,911,215 | 10/1975 | Hurst et al. . |
| 3,921,165 | 11/1975 | Dym . |
| 3,927,593 | 12/1975 | Kawamura . |
| 3,944,740 | 3/1976 | Murase et al. . |
| 3,952,156 | 4/1976 | Lahr . |
| 3,958,234 | 5/1976 | Hoo . |

| Patent No. | Date | Inventor | Class |
|---|---|---|---|
| 3,968,467 | 6/1976 | Lampen et al. | |
| 3,974,332 | 8/1976 | Abe et al. | |
| 3,975,592 | 8/1976 | Carvey | |
| 3,982,219 | 9/1976 | Rehak | |
| 3,983,322 | 9/1976 | Rodgers | |
| 3,992,579 | 11/1976 | Dym et al. | |
| 3,999,012 | 12/1976 | Dym | |
| 4,014,217 | 3/1977 | Lagesse et al. | |
| 4,022,971 | 5/1977 | Rodgers | |
| 4,023,167 | 5/1977 | Wahlstrom | |
| 4,029,899 | 6/1977 | Gordon | 178/19 |
| 4,054,746 | 10/1977 | Kamm | |
| 4,061,966 | 12/1977 | Sedlacek et al. | |
| 4,070,544 | 1/1978 | Lambden | |
| 4,080,515 | 3/1978 | Anderson | |
| 4,080,601 | 3/1978 | Alcorn, Jr. | |
| 4,087,791 | 5/1978 | Lemberger | |
| 4,088,842 | 5/1978 | Ikedo | |
| 4,110,556 | 8/1978 | Hawkes | |
| 4,112,597 | 9/1978 | Seaver | |
| 4,126,760 | 11/1978 | Gordon | |
| 4,128,209 | 12/1978 | Johnson | |
| 4,137,517 | 1/1979 | Garcea | |
| 4,178,481 | 12/1979 | Kley | |
| 4,185,165 | 1/1980 | Fencl | |
| 4,203,088 | 5/1980 | Sado et al. | |
| 4,205,199 | 5/1980 | Mochizuki | |
| 4,206,314 | 6/1980 | Prugh et al. | |
| 4,208,642 | 6/1980 | Saunders | |
| 4,208,648 | 6/1980 | Naumann | |
| 4,210,775 | 6/1990 | Rodgers et al. | |
| 4,213,005 | 7/1980 | Cameron | |
| 4,227,044 | 10/1980 | Fencl | |
| 4,235,141 | 11/1980 | Eventoff | |
| 4,240,065 | 12/1980 | Howbrook | |
| 4,243,843 | 8/1981 | Rocheleau | |
| 4,255,617 | 3/1981 | Carau, Sr. et al. | |
| 4,260,852 | 4/1981 | Fencl | |
| 4,268,815 | 5/1981 | Enentoff et al. | |
| 4,273,954 | 6/1981 | Takeuchi et al. | |
| 4,289,927 | 9/1981 | Rodgers | |
| 4,301,447 | 11/1981 | Funk et al. | |
| 4,334,124 | 7/1982 | Imsand et al. | |
| 4,368,351 | 1/1983 | Zimmer | |
| 4,368,352 | 1/1983 | Davis | |
| 4,418,242 | 11/1983 | Kouno | |
| 4,423,286 | 12/1983 | Bergeron | |
| 4,444,998 | 4/1984 | House | |
| 4,451,698 | 5/1984 | Whetstone et al. | |
| 4,455,451 | 6/1984 | Kriz | |
| 4,471,162 | 9/1984 | Aono et al. | |
| 4,473,717 | 9/1984 | Parnell et al. | |
| 4,477,877 | 10/1984 | Nakamura et al. | |
| 4,479,032 | 10/1985 | Parnell | |
| 4,488,000 | 12/1984 | Glenn | |
| 4,492,818 | 1/1985 | Abe | |
| 4,494,105 | 1/1985 | House | |
| 4,497,977 | 2/1985 | Saito et al. | |
| 4,504,832 | 3/1985 | Conte | |
| 4,506,336 | 3/1985 | Hird | |
| 4,507,523 | 3/1985 | Gohara et al. | |
| 4,514,688 | 4/1985 | Whetstone | |
| 4,550,250 | 10/1985 | Mueller et al. | |
| 4,554,409 | 11/1985 | Mitsui et al. | |
| 4,560,830 | 12/1985 | Perl | |
| 4,564,835 | 1/1986 | Dhawan | |
| 4,564,928 | 1/1986 | Glenn et al. | |
| 4,568,798 | 2/1986 | Ambros et al. | |
| 4,568,799 | 2/1986 | Kobayashi et al. | |
| 4,568,928 | 2/1986 | Biferno | |
| 4,570,033 | 2/1986 | Hulls | |
| 4,577,058 | 3/1986 | Collins | |
| 4,581,483 | 4/1986 | Ralston | |
| 4,582,955 | 4/1986 | Blesser | |
| 4,608,658 | 8/1986 | Ward | |
| 4,616,106 | 10/1986 | Fowler et al. | |
| 4,617,515 | 10/1986 | Taguchi et al. | |
| 4,631,356 | 12/1986 | Taguchi et al. | |
| 4,634,973 | 1/1987 | Murakami et al. | |
| 4,647,931 | 3/1987 | Mawhinney | |
| 4,649,232 | 3/1987 | Nakamura et al. | |
| 4,656,472 | 4/1990 | Walton | |
| 4,658,373 | 4/1987 | Murakami et al. | |
| 4,659,874 | 4/1987 | Landmeier | |
| 4,661,656 | 4/1987 | Rodgers et al. | |
| 4,663,625 | 5/1987 | Yewen | |
| 4,672,154 | 6/1987 | Rodgers et al. | |
| 4,672,155 | 6/1987 | Naruse | |
| 4,677,259 | 6/1987 | Abe | |
| 4,678,870 | 7/1987 | Taguchi et al. | |
| 4,689,448 | 8/1987 | Snyder et al. | |
| 4,692,568 | 9/1987 | Morita | |
| 4,694,124 | 9/1987 | Blesser | |
| 4,697,244 | 9/1987 | Murakami et al. | |
| 4,700,022 | 10/1987 | Salvador et al. | |
| 4,704,501 | 11/1987 | Taguchi et al. | |
| 4,709,209 | 11/1987 | Murakami et al. | |
| 4,710,595 | 12/1987 | Kimura | |
| 4,711,977 | 12/1987 | Miyamori et al. | |
| 4,713,496 | 12/1987 | Kumura et al. | |
| 4,717,793 | 1/1988 | Kobayashi | |
| 4,728,944 | 3/1988 | Tamaru et al. | |

| | | |
|---|---|---|
| 4,736,073 | 4/1988 | Abernethy . |
| 4,740,660 | 4/1988 | Kimura . |
| 4,777,329 | 10/1988 | Maillicoat . |
| 4,786,765 | 11/1988 | Yamanami et al. . |
| 4,794,209 | 12/1988 | Asada et al. . |
| 4,795,858 | 1/1989 | Yamazaki . |
| 4,798,920 | 1/1989 | Makino et al. . |
| 4,800,240 | 1/1989 | Bechet . |
| 4,806,708 | 2/1989 | Yahagi . |
| 4,806,918 | 2/1989 | Berke et al. . |
| 4,818,826 | 4/1989 | Kimura . |
| 4,818,851 | 4/1989 | Kimura . |
| 4,837,716 | 6/1989 | Chia-Hui . |
| 4,841,290 | 6/1989 | Nakano et al. . |
| 4,845,478 | 7/1989 | Taguchi et al. . |
| 4,848,496 | 7/1989 | Murakami et al. . |
| 4,855,538 | 8/1989 | Jacob et al. . |
| 4,859,814 | 8/1989 | Sciacero et al. . |
| 4,878,553 | 11/1989 | Yamanami et al. . |

FOREIGN PATENT DOCUMENTS

| | | |
|---|---|---|
| 49-74847 | 7/1974 | Japan . |
| 533130 | 6/1976 | Japan . |
| 58-201187 | 11/1983 | Japan . |
| 1222342 | 2/1971 | United Kingdom . |
| 1440130 | 6/1976 | United Kingdom . |

OTHER PUBLICATIONS

GTCO Datatizer drawing manual (1976).

GTCO Datatizer Grid or Tablet Digitizer brochure (1975).

EXAR Operational multiplier XR-2208 brochure (1976).

Excerpts from *Operational Amplifiers, Design and Applications*, edited by Tobey, Graeme and Huelsman, 413–426 (1971).

Excerpts from *Analog and Digital Electronics for Scientists*, by Vassos and Ewing, 115–119 (1972).

Bendix Datagrid II Classic Digitizer Configuration—Operation and Maintenance Manual (Mar. 1978).

"DIY Computer Graphics Hardware," by D. I. Cowie, CME, 65–67 (Jul. 1977).

"The 4662—A New Concept: Interactive Digital Plotting," Tekscope of TEKTRONIX.

Hardware to Interface, a Computek GT-50 Graphic Tablet with a Digital Computer Manual, by James R. Carlberg and Matthew W. Yuschik (1977).

A Graphic Tablet Display Console for use under time--sharing Manual, by I. Gallenson (Aug. 11, 1967).

"Understanding Digitizer Resolution and Accuracy," by K. Dunn, Mini-Micro Systems, 111–114 (Dec. 1981).

Decision Support Systems: Theory, Final Report—Delivery Order No. 0999-01-DAAG29-7-6-D-0100, presented by J. J. Jarvis, Georgia Institute of Technology (1976).

David W. Taylor Naval Ship Research and Development Center's Users' Manual—Graphics Data Reduction and Design Station by R. Chen and R. F. Shore (Jul. 1976).

Air Force Institute of Technology—Thesis—Implementation of a Grid-Based Line-Drawing Quantization System by J. N. Perry (Dec. 1982).

G. R. Stilwell, Jr. and E. S. Schlig, "Non-Destructive Graphic Cursors and Light Pen Tracking on AC Gas Discharge Display Panels," 1976 Biennial Display Conference Materials, pp. 121–127, presented in New York City, N.Y. on Oct. 12–14, 1976.

An Interactive System for Agricultural Acreage Estimates Using Landsat Data, by M. Ozaga, W. E. Donovan and C. P. Gleason, Machine Processing for Remotely Sensed Data Symposium, 113–123 (1977).

Glauert Dissertation.

Lawrence Fleming, "Position Transducer for Use at Extreme Environmental Temperatures," *The Review of Scientific Instruments*, vol. 36, No. 6 (Jun. 1965).

P. J. Ye, H. Hugli and F. Pellandini, "Techniques for On-Line Chinese Character Recognition with Reduced Writing Constraints," *IEEE*, 1984, Institut de Microtechnique de L'Universite de Neuchatel.

David A. Czenkusch, "High-Resolution Digitizing Techniques with an Integrating Digital Multimeter," *Hewlett-Packard Journal*, Apr. 1989.

Theo Pavlidis, Bell Labs, "Effects of Distortions on the Recognition Rate of a Structural OCR System," *IEEE*, 1983.

R. E. Crossley and R. C. Gonzalez, "A Real-Time Digitizer for Stereo Image Processing," *Pattern Recognition*, vol. 14, Nos. 1–6, pp. 289–296, 1981.

Chris Rook, "Sampling Digitizer Produces Broadcast--Quality Messages," *Mini-Micro Systems*, Jul. 1984.

Keith Paton, "Line Detection by Local Methods," *Computer Graphics and Image Processing*, 9316–332 (1979).

Frank P. Carau, "Easy to Use, High Resolution Digitizer Increases Operator Efficiency," *Hewlett-Packard Company*, 1978.

Frederick J. Porter, "Light Pen Aids User Interaction with Display," *Hewlett-Packard Journal*, Dec. 1980.

Kathy Dunn, "Understanding Digitizer Resolution and Accuracy," *Mini-Micro Systems*, Dec. 1981.

J. F. Hevesi, Analog Data Tablet, *IBM Technical Disclosure Bulletin*, vol. 23, No. 2, Jul. 1980.

S. Tamura, K. Tanaka and K. Ozakaki, "Light Emitting Diode Tablet Using M-Sequence," *Applied Optics*, vol. 19, No. 11, Jun. 1, 1980.

H. M. Presby, D. Marcuse and H. W. Astle, "Automatic Refractive-Index Profiling of Optical Fibers," *Applied Optics*, vol. 17, No. 14, Jul. 15, 1978.

C. Schmandt, "Interactive Three Dimensional Computer Space," *SPEI*, vol. 367, Processing and Display of Three-Dimensional Data, 1982.

"Drafting System is only $24,000," *Electronics*, Mar. 10, 19__.

Jeff Knapp, "$20 VIC Digitizer," *Computer!*, Sep. 1982.

F. Graf and A. Penzkofer, "Application of an X—Y Recorder as a Versatile Mathematical Instrument," *J. Phys. E: Sci. Instrum.*, vol. 12, 1979.

Graphic Line Finishing Experiments, *Final Technical Report RADC-TR-76-47*, Rome Air Development Center, Feb. 1976.

William G. McLellan, et al., "Digitizer Evaluation," Rome Air Development Center, Griffiss Air Force Base, N.Y.

W. Ridge, "Digitizers," *Digital Design*, Dec. 1979.

R. Wolfe, "Keyboard for Electronic Tablet or Digitizer," *IBM Technical Disclosure Bulletin*, vol. 14, No. 3, Aug. 1971.

C. Besant, "CADMAC—A Fully Aided Interactive Computer Aided Design System," *Computer Aided Design*, vol. 4, No. 2, Jan. 1972.

W. Wilbey, "Emerging Technologies: More Disruptions?" *Application Techniques: International Computer State of the Art Report*, Mar. 2-4, 1972.

"Touch of the Finger Activates Digitizer," *Canadian Electronics Engineering*, vol. 15, No. 10, Oct. 27, 1971.

"Image Digitization Using a Self-Scanned Linear Photodiode Array," *SPIE*, vol. 149, Applications of Digital Image Processing, 1978.

Dale Autrecht, *An Intelligent, Programmable Transient Digitizer* "8-Bit Digitizer Samples at 20 MHz," *Electronics*, Jun. 19, 1980.

"Accuracy of Semiautomatic Measurements on Digitizing Equipment," *Prackt.*, Met 20, (1983).

Intersil data sheet for the ADC0801-ADC0804 8-Bit Microprocessor Compatible A/B Converters, pp. 4-9.

"Input/Output Technology" by R. Parker Computer Design, 157-180 (Dec., 1982).

"$20 VIC Digitizer", by Jeff Knapp, *Computer* (Sep. 1982).

*Primary Examiner*—S. D. Schreyer

[57] ABSTRACT

A digitizing system includes a first plurality of spaced parallel grid conductors and a second plurality of spaced parallel grid conductors orthogonal to the first plurality of spaced parallel grid conductors. The location of a movable coil arranged on a pen or cursor is determined for each plurality of grid conductors coarsely by sampling the voltage induced in one of the grid conductors from a signal applied to the coil to determine whether the coil is above or below this grid conductor. Through careful selections, a very few grid conductors can be sampled to quickly locate the two grid conductors immediately adjacent to the center of the driven coil. The ratio of the voltages present on these two grid conductors is matched against a list of known ratios representing various positions between the two grid conductors.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *